May 28, 1968  H. J. HOWIE  3,385,695
PROCEDURES AND APPARATUS FOR FEEDING PARTICULATE
SOLIDS INTO A CONDENSABLE GAS
Filed June 3, 1965  4 Sheets-Sheet 1

INVENTOR.
HENRY JAMES HOWIE
BY
Robert S. Dunham
ATTORNEY

May 28, 1968 H. J. HOWIE 3,385,695
PROCEDURES AND APPARATUS FOR FEEDING PARTICULATE
SOLIDS INTO A CONDENSABLE GAS
Filed June 3, 1965 4 Sheets-Sheet 2

INVENTOR.
HENRY JAMES HOWIE
BY
Robert S. Dunham
ATTORNEY

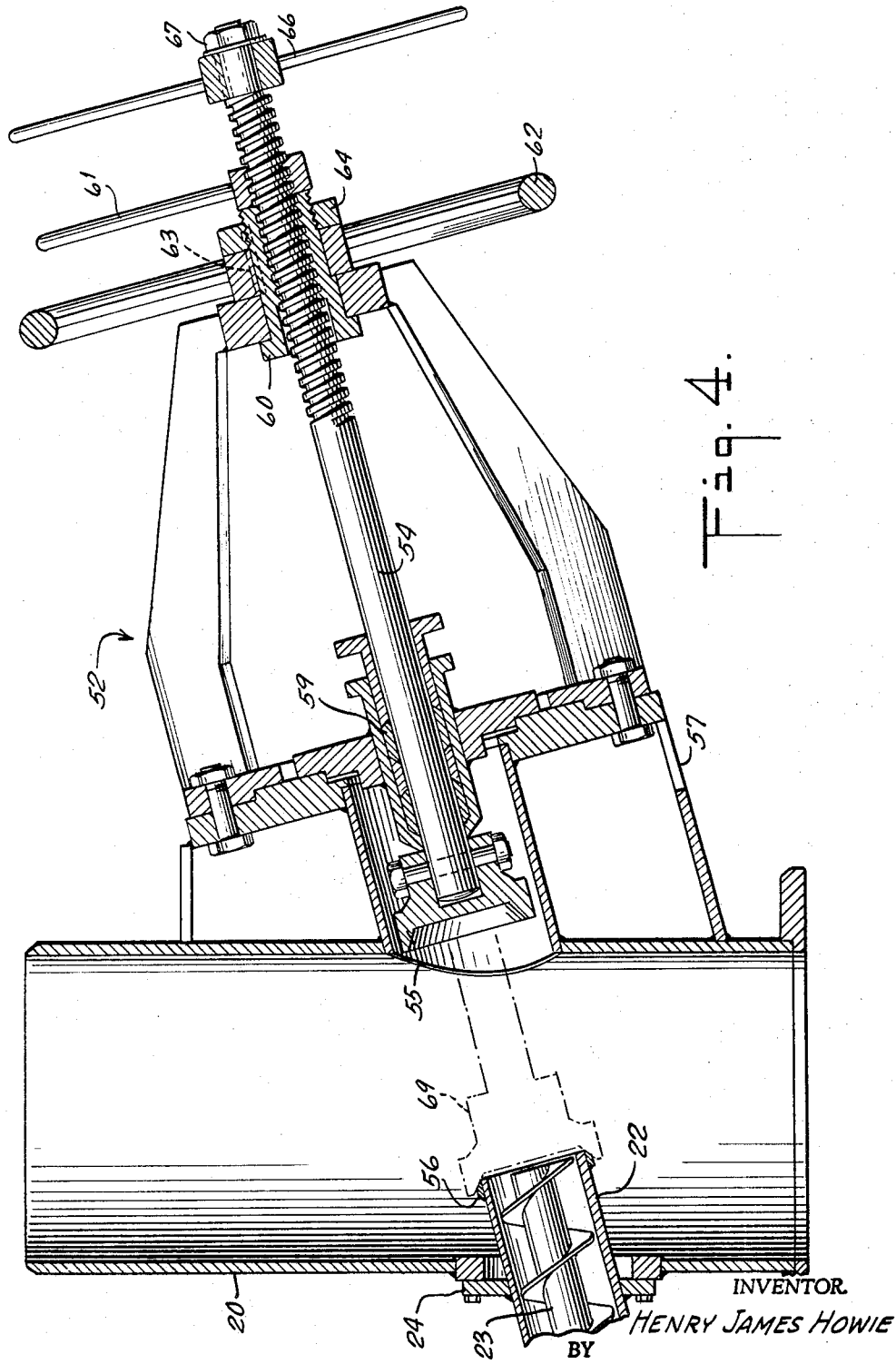

3,385,695
Patented May 28, 1968

3,385,695
PROCEDURES AND APPARATUS FOR FEEDING PARTICULATE SOLIDS INTO A CONDENSABLE GAS
Henry J. Howie, Arvida, Quebec, Canada, assignor to Aluminium Laboratories Limited, Montreal, Quebec, Canada, a corporation of Canada
Filed June 3, 1965, Ser. No. 461,016
19 Claims. (Cl. 75—68)

This invention relates to methods and apparatus for delivering particulate solid material into a confined region containing an atmosphere of condensable gas. In a specific sense, the invention concerns the production of gaseous aluminum halide by evaporation from a molten mixture of the aluminum halide with other halide or halides, e.g. in connection with the so-called subhalide distillation of aluminum. The invention in such specific aspect relates particularly to methods and apparatus for supplying, to a body of the molten mixture contained in a confined chamber having an atmosphere of the gaseous aluminum halide, quantities of one or more of the constituent halides in solid form, as to establish or maintain in the mixture desired proportions of the supplied halide or halides.

The production of purified aluminum metal from crude aluminum-containing alloys by subhalide (e.g. monochloride) distillation, as disclosed for example in United States Patent No. 2,937,082, involves reaction of the alloy with aluminum normal halide (e.g. aluminum trichloride, $AlCl_3$) in gaseous state. Thus, in an illustrative instance of such operation, aluminum trichloride gas is introduced to a heated mass of the alloy in a suitable converter or furnace, preferably as a continuous flow of gas. In a latter stage of the distillation system, aluminum trichloride gas is discharged; for the sake of convenience and economy of operation this latter gas is, in accordance with conventionally proposed procedures, recycled to the converter for re-use therein.

The aluminum trichloride gas as discharged from the distillation system contains gaseous impurities such as hydrogen, produced in the system, which tend to build up as the gas is repeatedly recycled, impairing the efficacy of the distillation process. It is therefore desirable to treat the gas, or at least a portion of it, before returning it to the converter, to remove these contaminants and thereby to prevent or control the accumulation of impurities in the gas. Such purification may be accomplished by condensing the aluminum trichloride to non-gaseous state, driving off the impurities (which remain in gaseous state), and subsequently re-evaporating the trichloride for return as a gas to the converter.

Certain procedures heretofore proposed for evaporating or re-evaporating aluminum trichloride, as in the aforementioned gas purification operation, involve establishing a molten mixture of aluminum trichloride and one or more alkali metal chlorides, e.g. such as sodium chloride, and heating a body of this molten mixture to evaporate aluminum trichloride therefrom. As evaporation proceeds, additional quantities of aluminum trichloride may be successively or continuously supplied to the molten body for absorption or condensation therein, to replenish the trichloride content of the body and thus to provide continuing exaporation of trichloride from the body.

In various evaporation procedures of this character, quantities of one or more of the chloride constituents of the molten mixture are supplied in divided solid form to a body of the molten mixture contained in a confined chamber having an atmosphere of aluminum trichloride gas. For example, in one such procedure for separating gaseous impurities from a circulating flow of aluminum trichloride gas in an aluminum subhalide distillation system, the trichloride-containing gas from the impurity-containing flow is first condensed to solid state, while the impurities, remaining in gaseous state, are separated therefrom and driven off. The solidified trichloride, in divided form, is then advanced to a confined evaporator chamber containing a heated body of the above molten mixture, and is absorbed in the molten mixture, from which aluminum trichloride is continuously re-evaporated as a purified gas for return to the converter of the distillation system.

An alternative procedure involves bringng the impurity-containing flow of trichloride gas into contact with a relatively cool flow of the molten mixture in a confined absorber chamber for direct absorption of the trichloride gas in the cooled melt, the impurities (remaining in gaseous state, as before) being driven off from the absorber chamber. The trichloride-enriched melt is advanced to an evaporator chamber where it is heated to re-evaporate aluminum trichloride therefrom as purified gas for return to the subhalide converter, and the molten mixture (now lean in aluminum trichloride) is then withdrawn from the evaporator, cooled, and recycled to the absorber chamber to absorb fresh quantities of trichloride gas. In the practice of this procedure supplemental quantities of aluminum trichloride and/or alkali metal chloride from an external source of supply are or may be introduced to the salt melt from time to time as necessary to establish and maintain desired relative proportions and amounts of the constituent salts in the mixture; these supplemental quantities of salts are commonly supplied in divided solid form to the melt in the absorber chamber.

In procedures such as the foregoing, the steps of supplying divided solid chloride material to the salt melt may be effected with advantageous convenience and simplicity of operation by delivering the solid chloride into the confined melt-containing chamber through a screw conveyor having an outlet end opening into the chamber at a locality above the level of the molten salt so that the chloride particles fall from this outlet end into the melt. However, certain special problems are encountered in such operation owing to the fact that the melt-containing chamber has an atmosphere of aluminum trichloride, which condenses readily to solid state. Thus, if this gas passes into the screw conveyor through the outlet end, it tends to condense therein as a solid, i.e. in the interstices between the advancing chloride particles, cementing the particles together with the result that the screw conveyor becomes partially or completely clogged. In addition, it has been found that during periods when the screw conveyor is not in use, trichloride gas from the chamber atmosphere tends to condense as a solid at the outlet end of the screw conveyor, blocking the outlet and thereby hindering subsequent start-up of the conveyor or even in some cases causing the conveyor drive to break upon attempted resumption of operation.

An object of the present invention is to provide procedures and apparatus for delivering divided solid material into a confined region having an atmosphere of condensable gas, such as aluminum trichloride gas or the like, in such manner as to prevent clogging of the path of advance of the material by condensation of the gas therein. Another object of the invention is to provide procedures and apparatus for delivering particulate solids into a gas-filled region while preventing access of the gas to the path of advance of material into such region. A further object is to provide such apparatus wherein clogging of the outlet end of the particle delivery path by condensation of gas is prevented during periods when delivery of particles is interrupted. Still another object is to provide such procedures and apparatus suitable for use in supplying solid halide material to a confined region containing a molten mixture of aluminum halide and one or more alkali metal halides and having an atmosphere of the auminum halide, as in operations for producing or purifying aluminum halide gas for use in the subhalide distillation of aluminum.

Further objects and advantages of the invention will be apparent from the detailed description hereinbelow set forth, together with the accompanying drawings, wherein:

FIG. 4 is a fragmentary elevational sectional view of the outlet end of the conveyor apparatus of FIG. 1.

Figure 1:
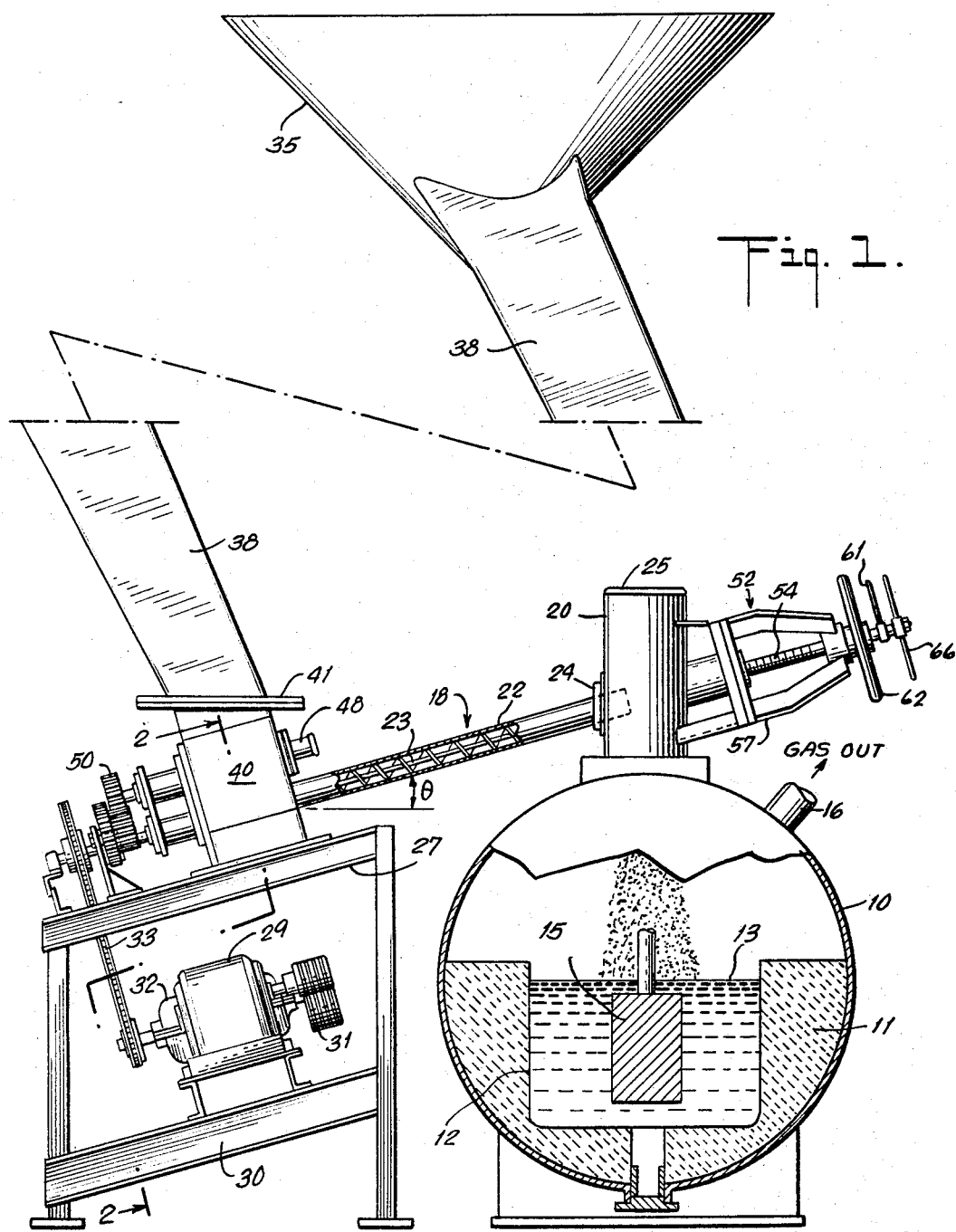
FIG. 1 is a simplified side elevational view, partly in section, of an aluminum trichloride evaporation system incorporating the apparatus of the invention in an illustrative embodiment.

Referring to the drawings, the apparatus of the invention in its illustrated embodiment is shown as associated with an aluminum trichloride evaporator adapted for use in the purification of a circulating flow of aluminum trichloride gas in an aluminum subhalide distillation system. This evaporator comprises a gas-tight steel vessel 10 and has an internal refractory lining 11 (composed, for example, of firebrick) defining an interior region 12 adapted to be filled with a heated body 13 of molten salt, e.g. to the level indicated in FIG. 1. The upper portion of the vessel 10 may be surrounded externally by a layer of conventional thermal insulation (not shown) such as fiberglass.

The body 13 is constituted of an electroconductive molten mixture of aluminum trichloride and one or more alkali metal chlorides, e.g. a mixture of aluminum trichloride and sodium chloride, and is heated by passage of alternating electric current therethrough between a plurality of electrodes (one of which is shown at 15) which are positioned in mutually spaced relation within the vessel 10 to be immersed in the molten body 13 and are connected to a suitable conventional power source (not shown). Such heating maintains the molten body at a temperature at which aluminum trichloride is evaporated therefrom i.e. as a purified gas; the latter gas fills the evaporator chamber above the level of the molten salt and is withdrawn from the chamber through a gas outlet indicated schematically at 16.

In the operation of the evaporator for treatment of all or part of a trichloride gas flow in an aluminum subhalide distillation system, trichloride gas from the impurity-containing flow is condensed to solid state at a locality external to the evaporator vessel 10, while the impurities, remaining in gaseous state, are driven off. The solid trichloride is then introduced in divided form to the heated molten salt body 13 in the evaporator chamber for absorption therein and subsequent re-evaporation from the molten body as pure aluminum trichloride gas. This gas, withdrawn through outlet 16, is returned to the converter (not shown) of the distillation system. As will be appreciated, in continuous operation the trichloride content of the molten mixture remains substantially constant, being replenished by the introduced solid trichloride as trichloride is removed from the body by evaporation; thus the molten body may be used for an indefinite period in effecting evaporation of successively supplied quantities of aluminum trichloride.

The apparatus of the invention in the form shown is arranged to effect the delivery of solid aluminum trichloride to the evaporator chamber in the foregoing operation. Specifically, the present apparatus includes a screw conveyor 18 (hereinafter further described) extending from an external locality into the interior of a vertical pipe section 20 which projects above and is secured to the evaporator vessel 10. This pipe section 20 opens downwardly into the top of the evaporator chamber, so that the particulate aluminum trichloride advanced into the pipe section by screw conveyor 18 falls from the outlet end of the screw conveyor through the latter pipe section and thence through the evaporator chamber into the molten body 13; consequently the aluminum trichloride atmosphere of the evaporator chamber extends upwardly into the pipe section 20.

Screw conveyor 18 comprises a gas-tight tubular housing or pipe 22 and a conveyor screw 23 positioned within the pipe 22 in coaxial relation thereto and cooperating with pipe 22 to effect advance of particulate material through the pipe when the screw 23 is rotated. The outlet end of pipe 22, secured to the side wall of pipe section 20 by a flange 24, projects into the interior of pipe section 20 and opens therein; the inlet end of pipe 22 is positioned at the aforementioned external locality from which the divided solid trichloride is to be advanced to the evaporator.

The pipe section 20, conveyor pipe 22, screw 23 and flange 24 may be fabricated, for example, of steel. The joints between pipe section 20, flange 24, and pipe 22, as well as the joint between the pipe section 20 and evaporator vessel 10, are made gas-tight, to prevent leakage of trichloride gas from the evaporator chamber. Similarly, the pipe section 20 is arranged so as to prevent gas communication therethrough between the evaporator chamber and the external air; for instance, the upper end of the pipe section may simply be sealed as by a head 25. Thus the interior of pipe section 20 constitutes a confined region filled with trichloride gas and communicating with the evaporator chamber.

As a particular feature of the invention, the axis of the screw conveyor (i.e. the axis of pipe 22) is inclined upwardly from the inlet end to the outlet end of the conveyor. That is to say, as indicated in FIG. 1, the screw conveyor axis is inclined at an angle $\theta$ to the horizontal such that the particulate trichloride advancing through the screw conveyor traverses an upwardly-sloping path. This upward inclination of the screw conveyor is found to have the effect of maintaining the pipe 22 substantially entirely filled with the particulate material advancing therethrough during the operation of the screw conveyor, so that there are no unfilled spaces or cavities in the pipe 22 into which aluminum trichloride gas from the evaporator atmosphere can flow and condense.

For assured maintenance of a continuous column of particles extending through and filling the pipe 22, the angle of inclination $\theta$ is preferably at least about 5°. If the angle $\theta$ is below 5°, the advancing particles may tend to run out of the outlet end of the screw conveyor with the result that the conveyor does not remain filled with the particles as desired. Thus, the value of $\theta$ may be in a range extending upwardly from about 5°, e.g. to about 45°. At angles of inclination above 45°, difficulty may be encountered in loading the particles into the screw conveyor and discharging the particles therefrom; in addition, the geometrical design of the equipment (i.e. the arrangement of the screw conveyor in relation to the evaporator vessel 10) is more complex at angles above 45° than at lesser angles of inclination. A presently preferred or practical range of values for the angle $\theta$ is between about 5° and about 30° to the horizontal; for example, an angle of inclination of about 15° has been found convenient and entirely effective in providing the desired gas-flow-inhibiting column of particles in pipe 22.

Very preferably, the conveyor screw 23 has uniform pitch between all flights and also has the leading surfaces of all flights ground smooth. Use of a screw having these features facilitates steady advance of the trichloride particles upwardly through the pipe 22 as a continuous column of particles filling the pipe, and in particular avoids any tendency of the particles to compact in the screw conveyor such as would cause the feed of particles to decrease or stop.

Figure 2:
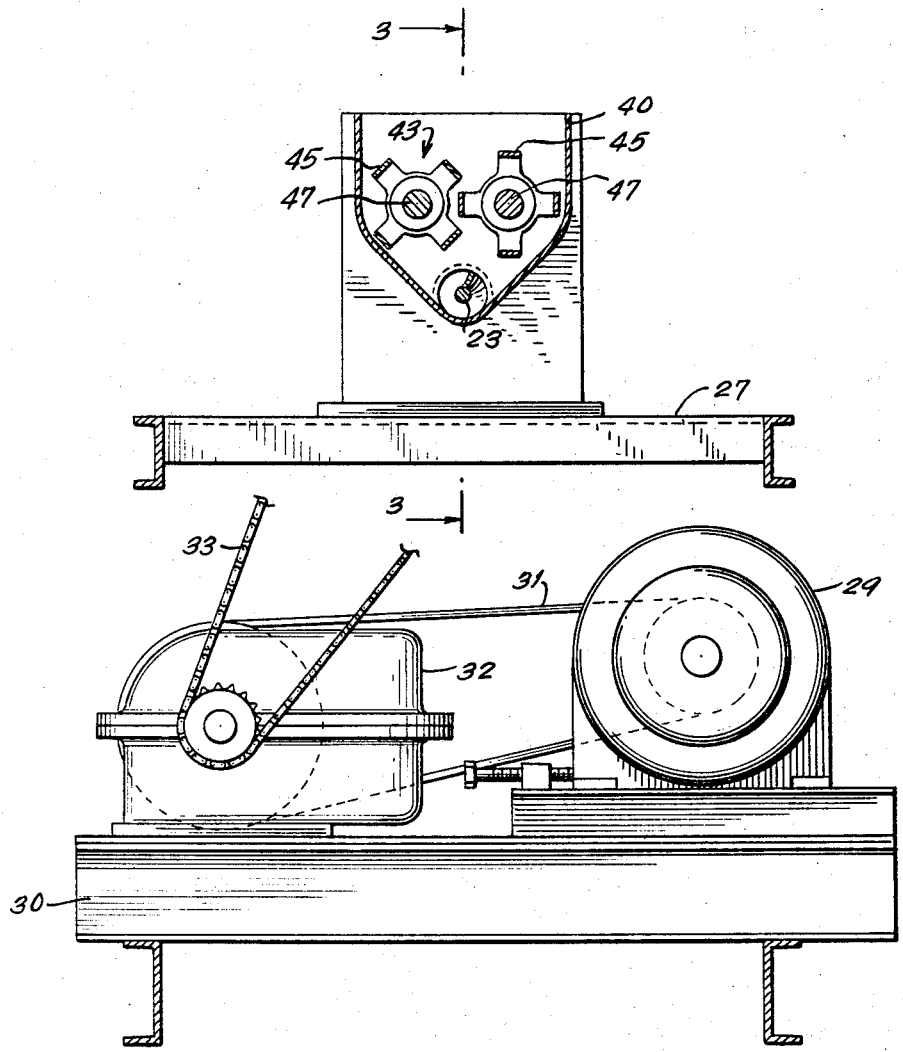
FIG. 2 is a view of the apparatus of FIG. 1, partly in section, taken along the line 2—2 of FIG. 1.

In the illustrated apparatus, the screw conveyor 18 is rigidly supported, in inclined position as described, by an inclined platform 27, e.g. constructed of steel frame members. The apparatus further includes drive means for rotating the conveyor screw in a direction to advance the trichloride particles through pipe 22 toward pipe section 20. This drive means may conveniently comprise a variable speed drive, e.g. of conventional character, so that the rate of advance of the trichloride through the screw conveyor may be controlled as desired. As shown in FIGS. 1 and 2, such drive may include a motor 29 mounted on a lower shelf 30 of the platform 27 and connected by belts 31 to a gear reducer device 32 also mounted on the shelf 30, the drive being taken from the latter device to the conveyor screw shaft by a chain and sprocket arrangement 33. It will be appreciated that the motor 29 and gear reducer device 32 (which provides the variable speed feature of the drive means) may be individually conventional elements, connected in a manner readily apparent to those skilled in the art, and accordingly need not be described in detail.

Figure 3:
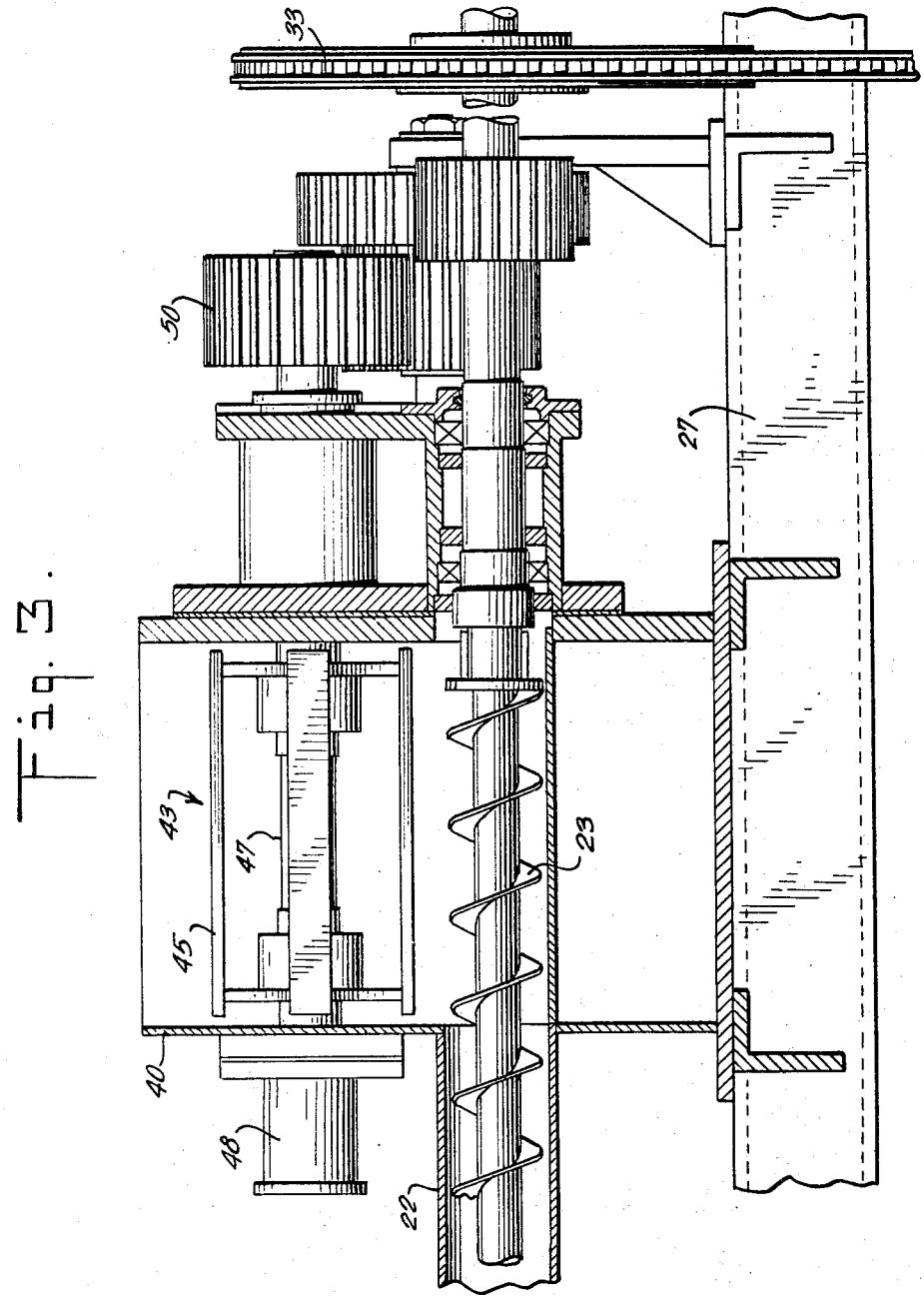
FIG. 3 is a fragmentary elevational sectional view of the inlet end of the conveyor apparatus of FIG. 1.

The divided solid aluminum trichloride is supplied to the inlet end of screw conveyor 18 from a source represented as supply hopper 35, which may, for example, receive solid aluminum trichloride condensed from the gas discharged from an aluminum subhalide distillation system as already described. The hopper 35, positioned generally above the inlet end of the screw conveyor, communicates downwardly therewith through a chute 38. As shown particularly in FIG. 3, the inlet end of the conveyor pipe 22 communicates with a feeder hopper 40 through which screw 23 extends; the feeder hopper extends upwardly above screw 23 and is secured to the lower end of chute 38 by flange means 41 so that solid aluminum trichloride is delivered to the feeder hopper, and thence to the screw conveyor, through the chute.

Also positioned in the feeder hopper, in the apparatus as shown, is a crusher assembly 43 comprising a pair of rotary breakers 45 disposed in axially parallel side-by-side-relation immediately above the screw 23 and having shafts 47 journalled in suitable bearings 48 mounted on the feeder hopper body. The breakers 45 are rotated by the conveyor screw drive means described above, drive for the breakers being taken from the conveyor screw shaft through appropriate gear means 50. These breakers are arranged to cooperate, when thus rotated, to comminute the solid trichloride descending into the feeder hopper 40 from the chute 38, so that the solid material falling onto the screw at the lower end of the feeder hopper is of desired particle size for advance through the screw conveyor; the rotating breakers also serve to control the rate of supply of trichloride particles to the screw conveyor.

In some instances, the solid trichloride descending through the chute 38 may be sufficiently finely divided so as to require no comminution before delivery to the screw conveyor. The crusher assembly 43 may in such cases be omitted, and other means (e.g. a mechanical vibrator of conventional character, not shown, positioned in the path of advance of the particles between chute 38 and the end of screw 23 in the feeder hopper 40) may be employed to provide a uniform rate of feed of trichloride to the conveyor.

Further in accordance with the invention, the illustrated apparatus (as particularly shown in FIG. 4) includes a manually operated valve assembly 52 mounted on the vertical pipe section 20 and adapted to effect gas-tight closure of the outlet end of conveyor pipe 22 when the screw conveyor is not operating. The valve assembly has a shaft 54 which extends through the side wall of pipe section 20 opposite to the outlet end of pipe 22, i.e. projecting into the interior of pipe section 20 toward pipe 22 and in coaxial relation thereto. The end of shaft 54 within the pipe section 20 (facing pipe 22) bears a valve head 55; this latter valve head is adapted to engage an annular valve seat 56 (e.g. fabricated of Inconel alloy and machined to provide a suitable valve seating surface) which is mounted on the outlet end of pipe 22.

To provide support for shaft 54, a steel valve body 57 is welded to the side wall of pipe section 20 through which the shaft projects. The shaft extends through a stuffing box 59, mounted in the valve body and providing a gas-tight seal surrounding the shaft but permitting shaft rotation and axial movement. Externally of the stuffing box 59, the shaft 54 is threaded through a sleeve 60, which is rotatably mounted in the valve body, and through a damping lever 61; a handwheel 62 is connected to the sleeve 60 by a key 63 and held in place on the sleeve by a nut 64, to facilitate manual rotation of the sleeve relative to the valve body. The shaft 54 extends outwardly beyond the sleeves 60 to terminate in a handle 66 which is secured to the shaft end by a nut 67.

To move the valve head 55 into or away from engagement with the valve seat 56 (i.e. between the open position shown and the closed position indicated by broken line 69 in FIG. 4) damping lever 61 is released, handle 66 is held, and handwheel 62 is turned to effect reciprocating motion of the shaft 54 through sleeve 60. The valve head may be secured in any desired position by means of damping lever 61, through which the shaft 54 is threaded and which holds the valve, when tightened, against accidental axial movement. When the valve head 55 is in engagement with valve seat 56, it may be rotated, i.e. without being displaced from the valve seat, by tightening damping lever 61 and turning either (or both) handwheel 62 and handle 66 so as to rotate the sleeve 60 and shaft 54 threaded therethrough relative to the valve body 57. By such rotation of the valve head in engagement with the valve seat, the valve surfaces are lapped and thereby cleaned in situ; in this way any particles adhering to the valve head or seat are removed therefrom, enabling assured attainment of the desired gas-tight closure of the screw conveyor outlet end.

In performing the process of the present invention with the apparatus described above, for effecting continuous supply of solid aluminum trichloride to the evaporator vessel 10 (while maintaining in the latter vessel a body of a molten mixture of aluminum trichloride and alkali metal chloride, e.g. sodium chloride, and while continuously heating such body by passage of alternating current through the body to evaporate aluminum trichloride therefrom), solid aluminum trichloride is continuously supplied to the feeder hopper 40 and the breakers 45 and conveyer screw 23 are continuously rotated by the motor 29. The crusher assembly 43 provides a continuous supply of comminuted solid aluminum trichloride to the lower end of feeder hopper 40; as this particulate trichloride accumulates in the latter locality, it is advanced therefrom by screw 23 through the screw conveyor pipe 22, i.e. from the inlet end to and through the outlet end of the pipe. The pipe 22 is maintained continuously filled with the advancing trichloride particles because of the upward inclination of the screw conveyor. From the outlet end of pipe 22, the particles fall through the pipe section 20 and the evaporator chamber into the molten body 13 to be absorbed therein.

That is to say, the trichloride particles are advanced by the rotation of the conveyor screw 23 along the upwardly inclined passage provided by pipe 22, into the trichloride gas-filled confined region defined by pipe section 20 and the evaporator vessel 10, as a continuous column of particles which fills the passage so that there are no openings or spaces in the passage into which aluminum trichloride gas can flow from the latter confined region. As stated, the angle of upward inclination of the passage is preferably at least about 5° and may be in a range extending upwardly e.g. to about 45°, an angle of between about 5° and about 30° being presently preferred.

The column of particles thus established and maintained in the pipe 22 is effective to inhibit back-flow of aluminum trichloride gas through the pipe from the evaporator chamber. The resistance of the column to back-flow of gas is dependent on the particle size characteristics of the divided solid trichloride constituting the column; in particular, the limiting value of back pressure (i.e. pressure differential between the outlet end of the screw conveyor and the inlet end of the conveyor) at which back-flow of gas begins to occur through a given column of particles is believed to be dependent on the size range of the particles in such column. Accordingly, the size range of the particles advanced through the screw conveyor is selected with regard to back presure across the conveyor to provide in the pipe 22 a column of particles effective to prevent back-flow of trichloride gas at such back pressure and thereby to prevent condensation of trichloride gas in the intersices between the advancing particles. As specific examples of particles size ranges providing satisfactory operation at various values of back pressure in the present process, it has been found that at values of back pressure up to about 50 mm. of mercury, particles in a size range between ¼ inch and ⅛ inch provide a column effective to prevent such back-flow; at values of back pressure up to about 300 mm. of mercury, particles in a size range between about ⅛ inch and about 20 mesh (Tyler scale, i.e. the standard U.S. scale) are effective to prevent back-flow; and at values of back pressure up to about 1500 mm. of mercury, particles in a size range below 20 mesh are effective to prevent back-flow.

With the foregoing process, continuous supply of solid aluminum trichloride to the molten mixture in the evaporator vessel 10 is readily and conveniently effected, and there is no tendency of the conveyor to become clogged by condensation of trichloride gas therein, because the gas cannot enter the conveyor from the evaporator chamber. In this connection it may be explained that whereas the temperature in the evaporator chamber is substantially higher than the temperature at which gaseous aluminum trichloride condenses (the molten body 13 ordinarily being maintained at a temperaure of several hundred degrees C.), temperature conditions in the screw conveyor pipe 22 are such that if the trichloride gas from the evaporator flows into the pipe 22, it tends to condense therein as a solid, cementing the advancing particles together. Such back-flow of trichloride gas into the screw conveyor would tend to occur if, for example, the screw conveyor were axially horizontal, because in such case the advancing particles would ordinarly not fill the conveyor pipe as a column effective to prevent back-flow of the gas, but would instead leave substantial unfilled spaces in the pipe.

When delivery of trichloride particles to the evaporator is stopped, the valve head 55 (which is in open position, i.e. held away from the outlet end of pipe 22, during the operation of the screw conveyor) is advanced into engagement with the valve seat 56, the valve head being initially rotated upon such engagement to clean the valve surfaces and thereby to afford assured gas-tight closure of the outlet end of the screw conveyor. This closure prevents solid condensation of aluminum trichloride from the evaporator atmosphere in the interstices between the particles at the outlet end of the screw conveyor, such as would otherwise tend to occur when the screw conveyor is not in operation.

While the process and apparatus of the invention have been described above as used to deliver solid aluminum trichloride to a molten salt evaporator of the type illustrated, the invention may also be employed in other operations for delivering particulate solid material into a confined region having an atmosphere of condensable gas such as aluminum halide. For example, the invention may be used in connection with aluminum trichloride gas purification procedures wherein the trichloride is absorbed directly, from an impurity-containing flow of the gas, in a molten mixture of aluminum trichloride and alkali metal chloride (e.g. sodium chloride) in a confined absorber chamber, and is subsequently re-evaporated from the mixture in an evaporator chamber. Specifically, the invention may be used in the latter procedures to supply to the molten mixture in the absorber chamber quantities of one or more of the salt constituents thereof in divided solid form, to establish or maintain desired proportions of these constitutents therein. For such use the present process and apparatus may be as described above, with the illustrated evaporator replaced by a suitable absorber vessel having appropriate means for effecting contact between the molten salt and the impurity-containing gas to promote absorption of the trichloride. The absorber vessel, like the evaporator vessel described above has an atmosphere of aluminum trichloride gas; and as in the case of operation with the evaporator, the invention as thus used affords delivery of the particulate solid material to the absorber in a manner that overcomes the problem of blockage of the path of material advance by condensation of trichloride gas therein.

Moreover, while the invention has been described above as associated with procedures for removing impurities from a circulating flow of aluminum trichloride gas in an aluminum subhalide distillation system, like procedures are applicable to the treatment of other aluminum halide material, viz aluminum tribromide ($AlBr_3$), having utility in the subhalide refining process. That is to say, in subhalide distillation operations utilizing aluminum tribromide rather than trichloride, and including recirculation of a continuous flow of the tribromide gas, the purification procedures described above may be used to treat of the latter flow, the molten salt mixture used in such case being a mixture of aluminum tribromide and one or more alkali metal bromides; and the process and apparatus of the present invention may be employed therewith in the manner and for the purposes above set forth with reference to treatment of aluminum trichloride. As will be appreciated, the halides described hereinabove are classified as those of a halogen having an atomic weight greater than that of fluorine and less than that of iodine.

By way of further and more specific illustration of the invention reference may be had to the following specific example of operation with apparatus of the type shown in FIGS. 1–4:

A screw conveyor comprising a screw 4 feet 8½ inches long having 19 equal pitches spaced approximately 3 inches apart, in a conveyor pipe having an internal diameter of about 3 inches and inclined upwardly at an angle of 15° to the horizontal, was used for delivering particulate solid aluminum trichloride to an evaporator having an external diameter of 4 feet 6 inches. The particle size of the solid aluminum trichloride was a graded mixture −4 +200 mesh. The screw conveyor was operated at various rates and for various periods of time to deliver aluminum trichloride to the evaporator. The back pressure across the conveyor varied from 50 to 300 mm. of mercury. Observed results are set forth in the following table:

| No. of Periods | Total Duration of Periods (Hrs.) | Powder Flow Rate (lb./hr.) | Remarks |
| --- | --- | --- | --- |
| 1 | 16 | 0 | Evaporator being heated, screw feeder valve closed. |
| 3 | 105 | 0 | Screw feeder stopped, evaporator "idling," valve closed. |
| 1 | 1.1 | 100 | Steady screw feeder and evaporator operation. |
| 1 | 1.0 | 200 | Do. |
| 6 | 176.8 | 300 | Do. |
| 3 | 8.1 | 350 | Do. |
| 3 | 2.8 | 400 | Do. |
| 3 | 3.2 | 450 | Do. |
| 8 | 38.8 | 500 | Do. |
| 5 | 4.2 | 550 | Do. |
| 4 | 6.4 | 600 | Do. |
| 3 | 8.6 | 650 | Do. |
| 7 | 23.6 | 700 | Do. |
| 5 | 18.7 | 750 | Do. |
| 6 | 61.4 | 800 | Do. |
| 3 | 3.8 | 850 | Do. |
| 3 | 36.2 | 900 | Do. |
| 1 | 8.0 | 1,000 | Do. |

The evaporator functioned to deliver aluminum trichloride gas throughout each period of its operation as indicated in the table. Although the conveyor, except at and very near its discharge end, remained at temperatures well below the condensation point of aluminum trichloride, no difficulty was encountered by reason of condensation of solid in the conveyor, and indeed no appreciable condensation deposits were found after any of the periods of operation.

It is to be understood that the invention is not limited tot he procedures and embodiments hereinabove specifically set forth, but may be carried out in other ways without departure from its spirit.

I claim:

1. In apparatus for delivering particulate solid material into a confined region having an atmosphere of condensable gas while preventing condensation of the gas in the path of advance of the material, the combination, with structure enclosing said confined region, of a tubular screw-conveyor housing extending to said structure from a locality external thereto along an upwardly inclined axis and opening at its upper end into such region, said upper end of said tubular housing constituting a valve seat; a conveyor screw disposed coaxially within said tubular housing for advancing said particulate material therethrough; means for driving said conveyor screw to advance said particulate material upwardly through said housing; means for supplying said particulate material to said tubular housing at said external locality; and valve means for effecting gas-tight closure of said upper end of said tubular housing, said valve means including a valve head disposed within said confined region and adapted to engage said valve seat, and means for displacing said valve head into and away from enaggement with said valve seat.

2. Apparatus as defined in claim 1, wherein said axis of said tubular screw-conveyor housing is inclined upwardly at an angle of at least about 5° to the horizontal.

3. Apparatus as defined in claim 2, wherein said angle of inclination of said tubular housing axis is not more than about 45° to the horizontal.

4. Apparatus as defined in claim 2, wherein said angle of inclination of said tubular housing axis is not more than about 30° to the horizontal.

5. Apparatus as defined in claim 1, wherein said axis of said tubular screw-conveyor housing is inclined upwardly at an angle of about 15° to the horizontal.

6. In a system for evaporating an aluminum halide from a molten mixture of said aluminum halide and at least one other halide, wherein a body of said molten mixture is contained in a confined chamber having an atmosphere of said aluminum halide, apparatus for supplying particulate solid halide material to said body of molten mixture, comprising structure defining said confined chamber; a tubular screw-conveyor housing for conducting said particulate halide material into said chamber, said tubular housing extending to said structure from a locality external thereto, said tubular housing being disposed with its axis inclined toward said chamber at an upward angle for keeping the tubular housing filled with particulate material to prevent passage of gas from the chamber into the tubular housing and having an upper end opening into said chamber above said body of molten mixture so that said particulate material advanced through said housing falls from said upper end into said body, said upper end of said housing constituting a valve seat; a conveyor screw disposed coaxially within said tubular housing for advancing said particulate material therethrough; means for rotating said conveyor screw to advance said particulate material upwardly through said housing; means for supplying said particulate material to said housing at said external locality; and valve means for effecting gas-tight closure of said upper end of said tubular housing, said valve means including a valve head disposed within said structure and adapted to engage said valve seat, means for displacing said valve head into and away from engagement with said valve seat, and means for rotating said valve head in engagement with said valve seat to effect cleaning of said valve head and seat.

7. In a system for evaporating an aluminum halide from a molten mixture of said aluminum halide and at least one other halide, wherein a body of said molten mixture is contained in a confined chamber having an atmosphere of said aluminum halide, apparatus for supplying particulate solid halide material to said body of molten mixture, comprising structure defining said confined chamber; a tubular screw-conveyor housing for conducting said particulate halide material into said chamber, said tubular housing extending to said structure from a locality external thereto along an axis inclined upwardly at an angle of between about 5° and about 45° to the horizontal and having an upper end opening into said chamber above said body of molten mixture so that said particulate material advanced through said housing falls from said upper end into said body, said upper end of said housing constituting a valve seat; a conveyor screw having uniform pitch between all flights with the leading surfaces of all flights ground smooth, disposed coaxially within said tubular housing for advancing said particulate material therethrough; means for rotating said conveyor screw to advance the particulate material upwardly through said housing; means for supplying said particulate material to said housing at said external locality, including means for controlling the rate of supply of said particulate material to said housing to maintain said rate of supply uniform; and valve means for effecting gas-tight closure of said upper end of said tubular housing, said valve means including a valve head disposed within said structure and adapted to engage said valve seat, means for displacing said valve head into and away from engagement with said valve seat, and means for rotating said valve head in engagement with said valve seat to effect cleaning of said valve head and seat.

8. In a system for evaporating aluminum trichloride from a molten mixture of aluminum trichloride and at least one alkali metal chloride, wherein a body of said molten mixture is heated in a confined chamber to effect evaporation of aluminum trichloride therefrom, apparatus for supplying particulate solid aluminum trichloride to said body of molten mixture, comprising structure defining said confined chamber, said structure including a main chamber portion containing said molten body and a vertical pipe portion extending above and opening downwardly into said main chamber portion; a tubular screw-conveyor housing extending to said vertical pipe portion from a locality external to said structure along an axis inclined upwardly at an angle of between about 5° and about 30° to the horizontal, said tubular housing having an outlet end projecting into said vertical pipe portion and opening therein, said outlet end constituting an annular valve seat; a conveyor screw having uniform pitch between all flights with the leading surfaces of all flights ground smooth, disposed coaxially within said tubular housing for advancing said particulate trichloride therethrough; means for driving said conveyor screw to advance said particulate trichloride upwardly through said housing; means for supplying solid trichloride to said tubular housing at said external locality, including means positioned at said external locality in the path of advance of said solid trichloride to said tubular housing for comminuting the supplied solid trichloride; and valve means mounted on said vertical pipe for effecting gas-tight closure of said outlet end of said tubular housing, said valve means including a valve shaft extending into said vertical pipe portion toward said upper end of said tubular housing in coaxial relation to said tubular housing, a valve head mounted on the end of said shaft within said vertical pipe portion and adapted to engage said valve seat, means for displacing said shaft in an axial direction to carry said valve head into and away from engagement with said valve seat, and means for rotating said shaft while said valve head is in engagement with said valve seat to effect rotation of said valve head relative to said valve seat for cleaning the opposed surfaces of said valve head and said valve seat.

9. In procedure for evaporating an aluminum halide from a molten mixture of the aluminum halide and at least one alkali metal halide, wherein a body of the molten mixture is contained in a confined region having an atmosphere of the aluminum halide, a method of delivering quantities of at least one of said halides to said confined region from a locality external thereto for absorption in said body of molten mixture, said method comprising advancing said one halide in particulate solid form from said external locality into said confined region through a laterally confined passage inclined upwardly in the direction of advance of said halide, by rotating a conveyor screw in said passage, while supplying said one halide to said passage in particulate solid form at said external locality, so as to maintain said passage substantially entirely filled with the particulate solid halide.

10. In procedure for evaporating an aluminum halide from a molten mixture of the aluminum halide and at least one alkali metal halide, wherein a body of the molten mixture is contained in a confined region having an atmosphere of the aluminum halide, a method of delivering quantities of at least one of said halides to said confined region from a locality external thereto for absorption in said body of molten mixture, said method comprising advancing said one halide in particulate solid form through a laterally confined passage inclined upwardly in the direction of advance of said one halide at an angle of at least about 5° to the horizontal, from said external locality to a locality in said confined region above said body of molten mixture and from which the particulate halide falls into said body, by rotating a conveyor screw in said passage, while supplying said one halide to said passage in particulate solid form at said external locality, so as to maintain said passage substantially entirely filled with the particulate solid halide.

11. A method according to claim 10, wherein said laterally confined passage is inclined upwardly at an angle of between 5° and about 45° to the horizontal.

12. A method according to claim 10, wherein said laterally confined passage is inclined upwardly at an angle of between 5° and about 30° to the horizontal.

13. A method according to claim 10, wherein said laterally confined passage is inclined upwardly at an angle of about 15° to the horizontal.

14. In procedure for evaporating an aluminum halide from a molten mixture of the aluminum halide and at least one alkali metal halide, wherein a body of the molten mixture is contained in a confined region having an atmosphere of the aluminum halide, a method of delivering quantities of at least one of said halides to said confined region from a locality external thereto for absorption in said body of molten mixture, said method comprising advancing said one halide in particulate solid form from said external locality into said confined region through a laterally confined passage inclined upwardly in the direction of advance of said halide, by rotating a conveyor screw in said passage, while supplying said one halide to said passage in particulate solid form at said external locality, so as to maintain said passage substantially entirely filled with the particulate solid halide, said particulate solid halide advanced through said passage being in a particle size range selected to provide in said passage a column of said particles effective to prevent back-flow of aluminum halide gas from said confined region through said passage.

15. In procedure for evaporating aluminum trichloride from a molten mixture of aluminum trichloride and at least one alkali metal chloride, wherein a body of the molten mixture is heated in a confined region having an atmosphere of evaporated aluminum trichloride, a method of delivering quantities of aluminum trichloride to said confined region from a locality external thereto for absorption in said body of molten mixture, said method comprising advancing aluminum trichloride in particulate solid form through a laterally confined passage inclined upwardly in the direction of advance of said solid aluminum trichloride at an angle of between about 5° and about 30° to the horizontal, from said external locality to a locality in said confined region above said body of molten mixture and from which the particulate aluminum trichloride falls into said body, by rotating a conveyor screw in said passage, while supplying aluminum trichloride to said passage in particulate solid form at said external locality, so as to maintain said passage substantially entirely filled with particulate aluminum trichloride.

16. A method according to claim 15, wherein said passage is inclined upwardly at an angle of about 15° to the horizontal.

17. A method according to claim 15, wherein said particulate aluminum trichloride supplied to said passage at said external locality is in a particle size range between about ¼ inch and about ⅛ inch.

18. A method according to claim 15, wherein said particulate aluminum trichloride supplied to said passage at said external locality is in a particle size range between about ⅛ inch and about 20 mesh.

19. A method according to claim 15, wherein said particlate aluminum trichloride supplied to said passage at said external locality has a particle size of not more than about 20 mesh.

References Cited
UNITED STATES PATENTS

| | | | |
|---|---|---|---|
| 766,903 | 8/1904 | Rónay | 266—27 |
| 2,524,476 | 10/1950 | Richardson | 266—27 X |
| 3,110,652 | 11/1963 | Thomsen | 202—118 X |
| 3,216,820 | 11/1965 | Phillips et al. | 75—68 |
| 3,240,590 | 3/1966 | Schmidt et al. | 75—68 X |

HYLAND BIZOT, *Primary Examiner.*

H. W. TARRING, *Assistant Examiner.*